Patented Dec. 26, 1950

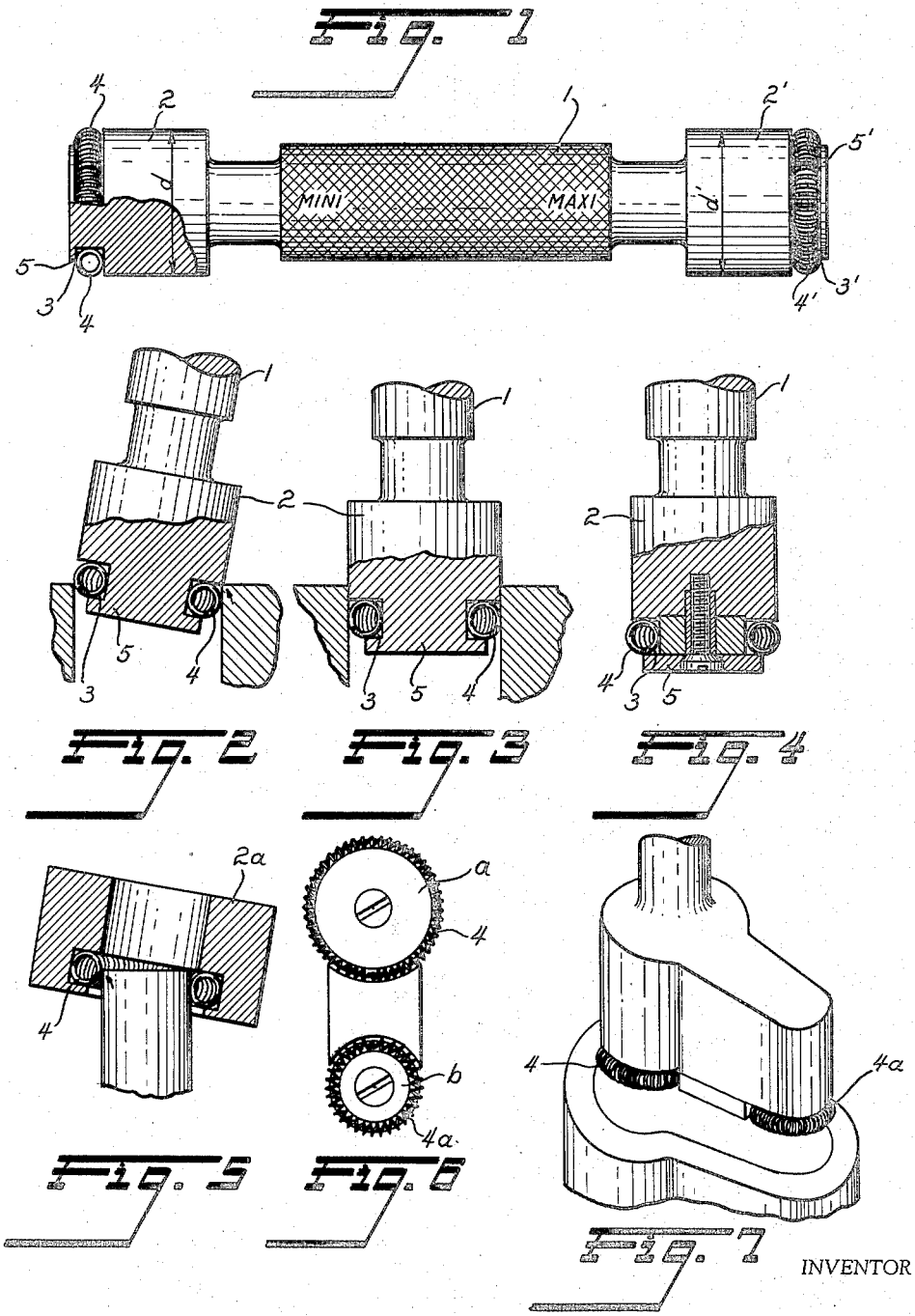

2,535,897

UNITED STATES PATENT OFFICE 2,535,897

GAUGE GUIDING MEANS

Pierre Buisson, Vanves, France

Application November 5, 1946, Serial No. 707,938
In France November 16, 1945

2 Claims. (Cl. 33—178)

This invention relates mainly to gauges, more especially of the plug and ring type. It has for its object the provision of new and useful means for guiding or piloting such gauges or other objects requiring mutual penetration, when in use.

The device according to this invention consists in a yielding element, such as a ring of coiled steel or other metal wire, which coil has a circular or similarlly curved cross section, seated in a groove near the working end of the plug or ring gauge and projecting only very slightly in radial direction beyond the circumference of the checking portion of the gauge.

The enclosed drawing shows in Figs. 1 to 7 some practical embodiments of the invention.

Fig. 1 illustrates a tolerance plug gauge according to this invention in elevation, partly in section.

Figs. 2 and 3 show how this checking gauge operates.

Fig. 4 shows a different form.

Fig. 5 shows a ring gauge, according to the invention.

Figs. 6 and 7 show a perspective and an end view of a checking plug gauge for a bore having a special shape.

The instrument shown in Fig. 1 comprises at both ends of a handle 1, a plug gauge 2 and 2' having the respective minimum $d$ and maximum $d'$ dimensions.

Near the end of each gauge an annular groove 3 is formed in the gauge body and a cylindrical wire coil ring 4 is seated in each groove, the greatest outer diameter of the rings being equal to or even slightly greater than that of the measuring portion 2 of the gauge body. Said spring, on account of its own elasticity is held down on the bottom of groove 3. The end portions 5 of the gauge which are much smaller than the measuring portion, are merely intended for keeping the spring in its seat.

When the plug gauge is directed slightly eccentrically into the bore which is to be checked, the annular spring yields, as shown in Fig. 2, and exerts a pressure on the walls of the bore, which pressure tends to re-centre and straighten the end of the plug. Then the measuring portion 2 engages the part to be measured at the point shown by the arrow, thus straightening the gauge (Fig. 3) without the workman even becoming aware of it. The plug gauge directed by the spring is easily introduced into the closest fittings.

Fig. 4 shows another embodiment according to which the grooved end portion is a separate member fastened by means of a screw, to the gauge body.

The yielding guiding device according to the invention can also be applied to female members, for instance, to a ring gauge 2a as shown in Fig. 5, where a wire coil annulus is seated on the bottom of an annular supporting groove. The inner diameter is equal to or slightly smaller than the outer diameter of the work to be measured.

The device according to the invention may be used for other than cylindrical bodies even when said bodies have recessed portions.

Figs. 6 and 7 show a special gauge for checking a bore the cross section of which shows two circular elements $a$ and $b$ and a straight portion $c$. The plug has two coil springs 4 and 4a, the guiding action nevertheless taking place only on the parts corresponding to the circular elements $a$ and $b$. Moreover, the springs may be mounted on cross sections other than a circular one; in such a case said cross-section must be such that the springs are firmly seated in the groove.

While the invention has been shown and described herein with considerable particularity, it will be well understood by those skilled in the art that various modifications may be resorted to without departing from the spirit of the invention. Refereince will therefore be had to the appended claims for a definition of the limits of the invention.

What I claim is:

1. In a gauge of the plug or ring type, the combination of a gauge body having an annular groove near an end of the gauge body and a ring of radially curved cross section and resilient material seated in said groove with its circumference slightly projecting radially beyond the circumference of the working end of the gauge.

2. In a gauge of the plug or ring type the combination of a gauge body having an annular groove near an end of the gauge body and a wire coil ring seated in said groove with its circumference slightly projecting radially beyond the circumference of the working end of the gauge.

PIERRE BUISSON.

REFERENCES CITED

The following references are of record in the file of this patent:

UNITED STATES PATENTS

| Number | Name | Date |
|---|---|---|
| 1,284,017 | Wittstein | Nov. 5, 1918 |
| 2,154,275 | Linn | Apr. 11, 1939 |
| 2,199,052 | Lee | Apr. 30, 1940 |
| 2,298,898 | Oswin | Oct. 13, 1942 |
| 2,298,899 | Oswin | Oct. 13, 1942 |
| 2,381,491 | Emmerton | Aug. 7, 1945 |

OTHER REFERENCES

Popular Mechanics, p. 39, Dec. 1945.
American Machinist, p. 198, June 6, 1946.